(12) United States Patent
Steigerwald

(10) Patent No.: US 9,687,068 B2
(45) Date of Patent: Jun. 27, 2017

(54) HANDLE FOR PLASTIC GROCERY BAGS OR THE LIKE AND RELATED SYSTEM

(71) Applicant: DIAMOND CONCEPTS, Rochester Hills, MI (US)

(72) Inventor: David John Steigerwald, Rochester Hills, MI (US)

(73) Assignee: DIAMOND CONCEPTS LLC, Rochester Hills, MI (US)

( * ) Notice: Subject to any disclaimer, the term of this patent is extended or adjusted under 35 U.S.C. 154(b) by 0 days.

(21) Appl. No.: 15/137,066

(22) Filed: Apr. 25, 2016

(65) Prior Publication Data

US 2016/0353868 A1 Dec. 8, 2016

Related U.S. Application Data

(60) Provisional application No. 62/169,616, filed on Jun. 2, 2015.

(51) Int. Cl.
| | |
|---|---|
| *A45F 5/00* | (2006.01) |
| *A45F 5/10* | (2006.01) |
| *B65D 33/16* | (2006.01) |
| *B60R 7/08* | (2006.01) |
| *F16M 13/02* | (2006.01) |

(52) U.S. Cl.
CPC ............ *A45F 5/1046* (2013.01); *B60R 7/08* (2013.01); *B65D 33/1666* (2013.01); *A45F 2005/108* (2013.01); *A45F 2005/1013* (2013.01); *F16M 13/02* (2013.01); *F16M 13/022* (2013.01)

(58) Field of Classification Search
CPC .. A45F 2005/1073; A45F 5/10; A45F 5/1026;
A45F 5/1046; A45F 2005/1006; A45F 2005/1093; A45F 2005/1013; A45F 2005/108; A45C 13/26; B65D 71/0003; B65D 33/1666; A63C 11/02; B65G 7/12; B25G 3/32; A47J 45/071; F16M 13/02; F16M 13/022; B60R 7/08
USPC ................................................. D9/434, 455
See application file for complete search history.

(56) References Cited

U.S. PATENT DOCUMENTS

| | | | | |
|---|---|---|---|---|
| 4,936,619 | A * | 6/1990 | Salazar ................ | A45F 5/1046 294/171 |
| D456,264 | S * | 4/2002 | Lalande ......................... | D9/451 |
| D566,546 | S * | 4/2008 | Williamson ................... | D9/434 |
| D624,411 | S * | 9/2010 | Puerta ............................ | D9/434 |
| 8,020,910 | B2 * | 9/2011 | Startzell ............... | A45F 5/1026 16/430 |
| 2009/0033110 | A1 * | 2/2009 | Fragale ..................... | A45F 3/14 294/26 |

\* cited by examiner

*Primary Examiner* — Stephen Vu
(74) *Attorney, Agent, or Firm* — Stephen T. Olson; Harness, Dickey & Pierce, P.L.C.

(57) ABSTRACT

A handle for one or more plastic grocery bags or the like includes a base and first and second arms. The base is generally planar base and extends along a longitudinal axis. The first and second arms extend from the base and each include an arcuate portion proximate the base and a flange extending from the arcuate portion. The arcuate portions of the first and second arms cooperatively define a generally circular opening for receiving at least one plastic bag handle and the flanges are spaced apart from one another proximate the first and second arms to define a gap for permitting the at least one plastic bag handle to enter the generally circular opening.

10 Claims, 12 Drawing Sheets

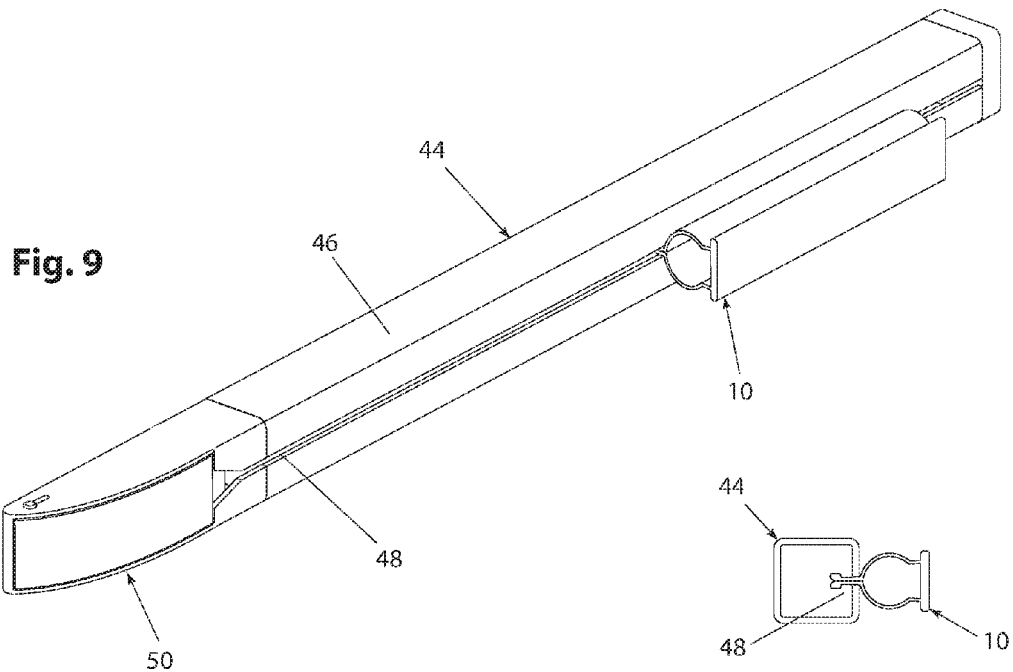
Fig. 9
Fig. 10
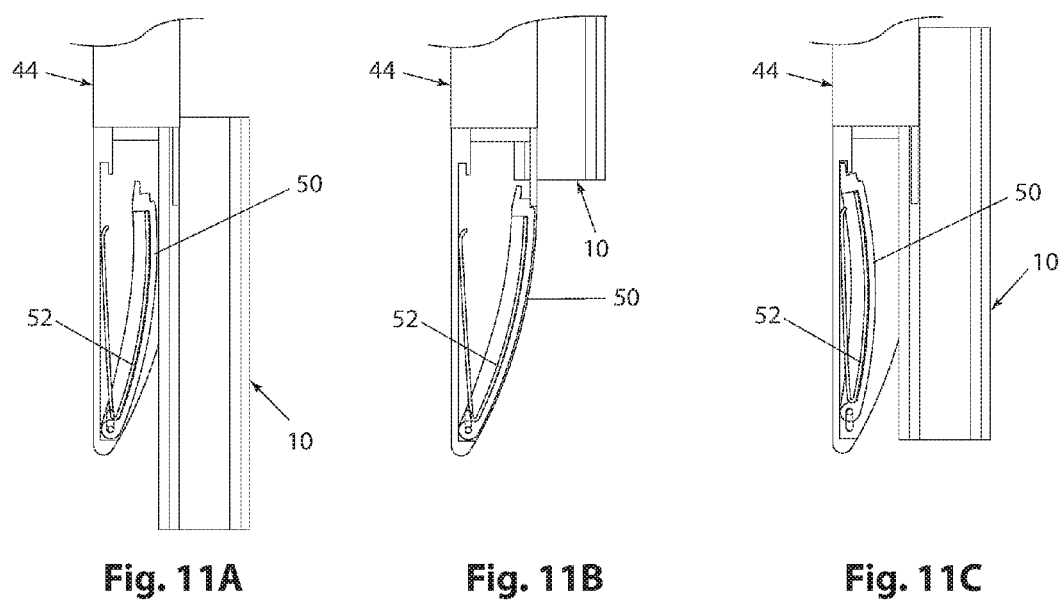
Fig. 11A    Fig. 11B    Fig. 11C

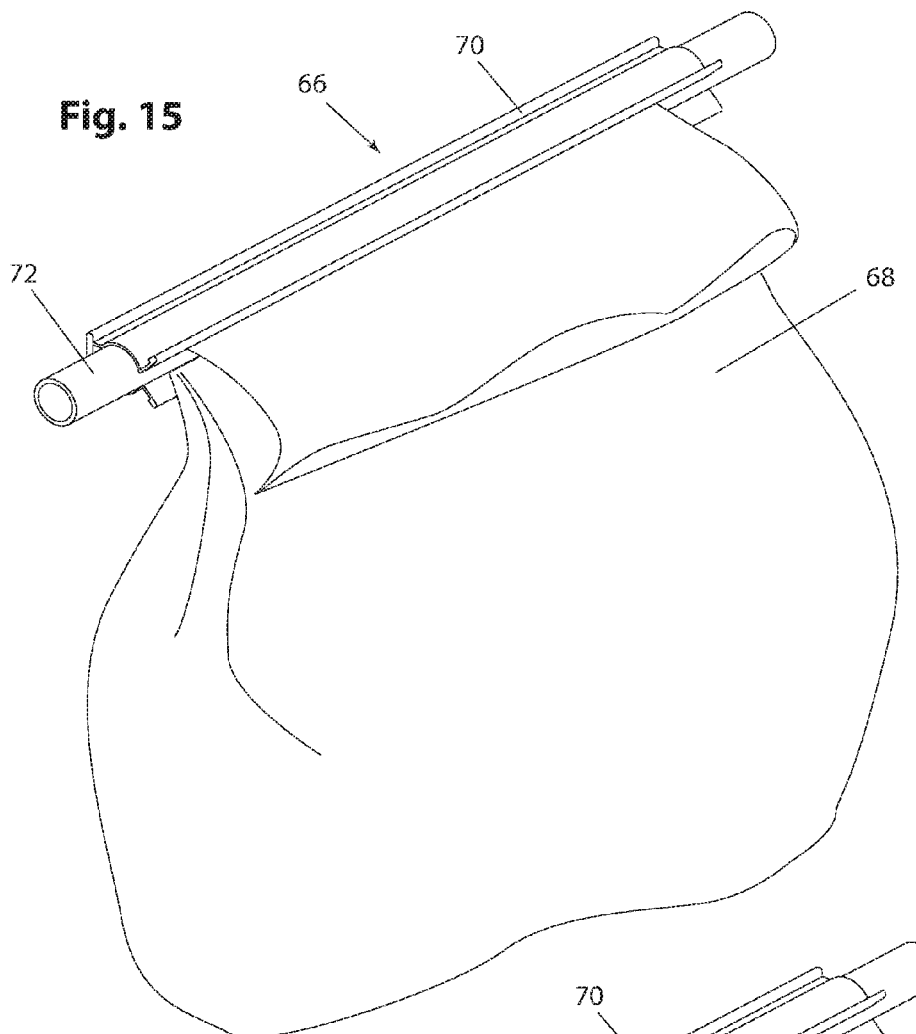
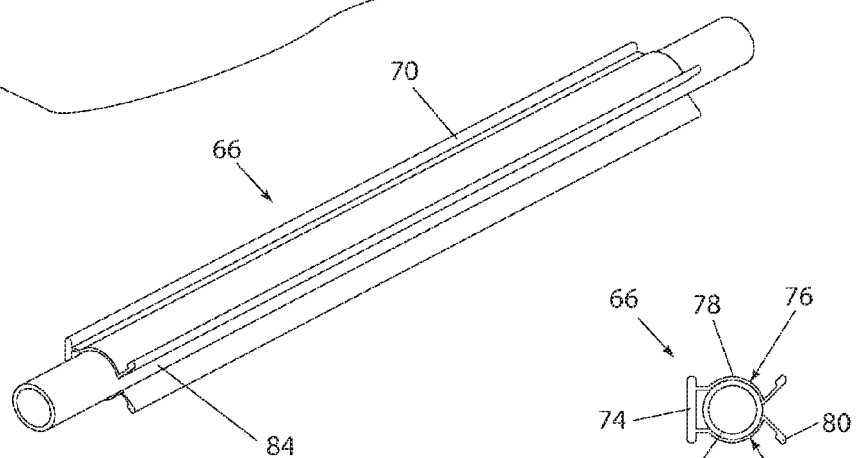

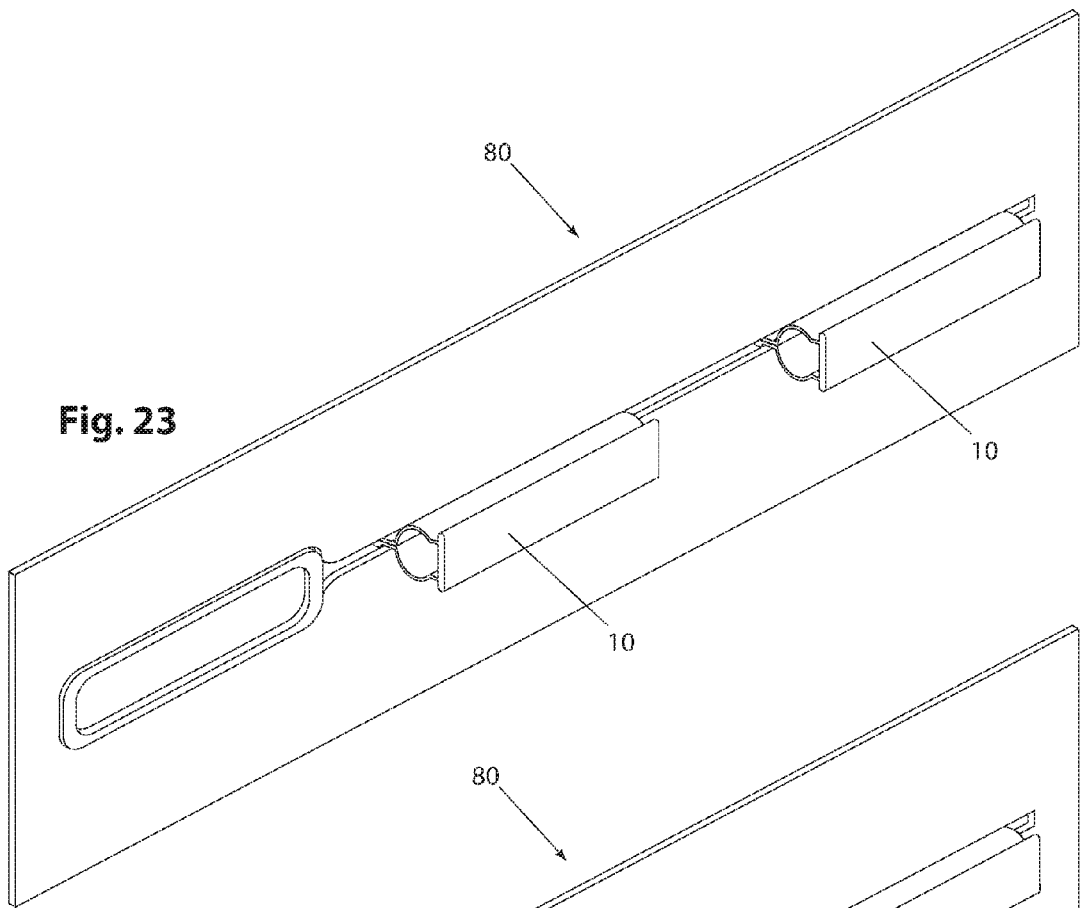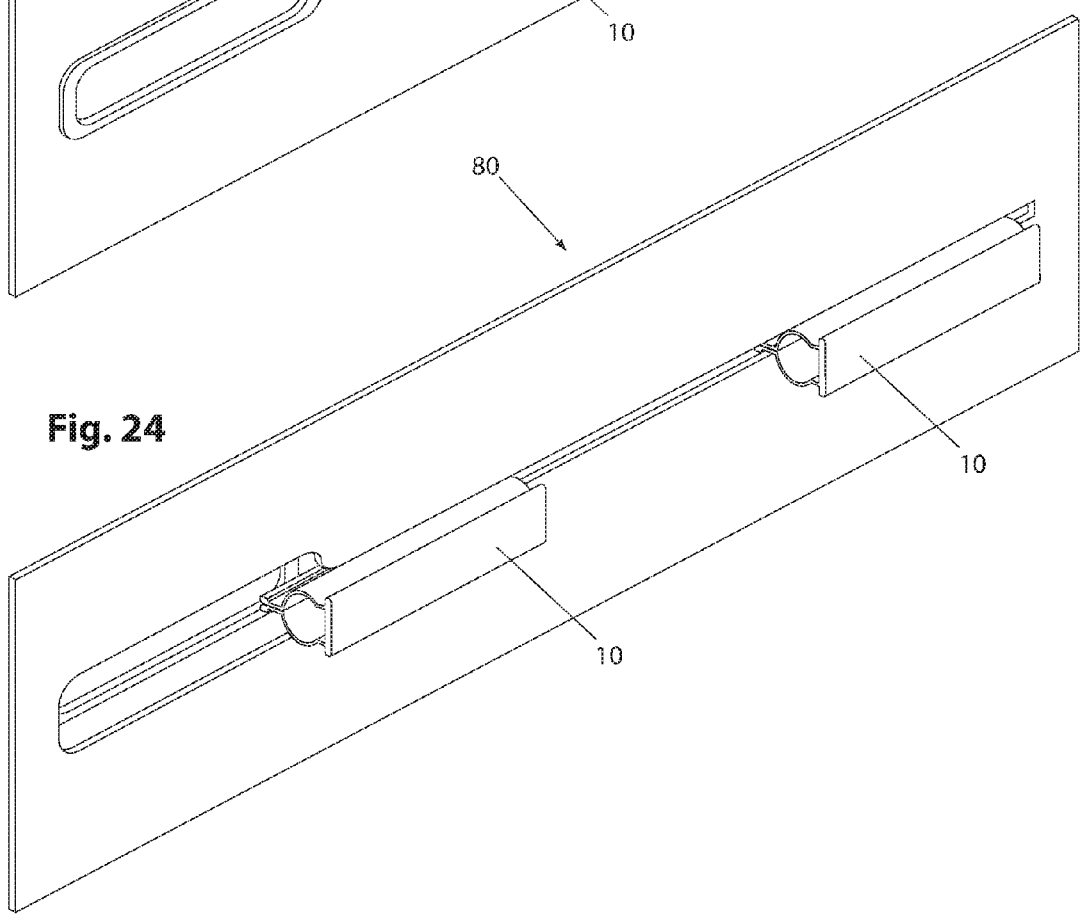

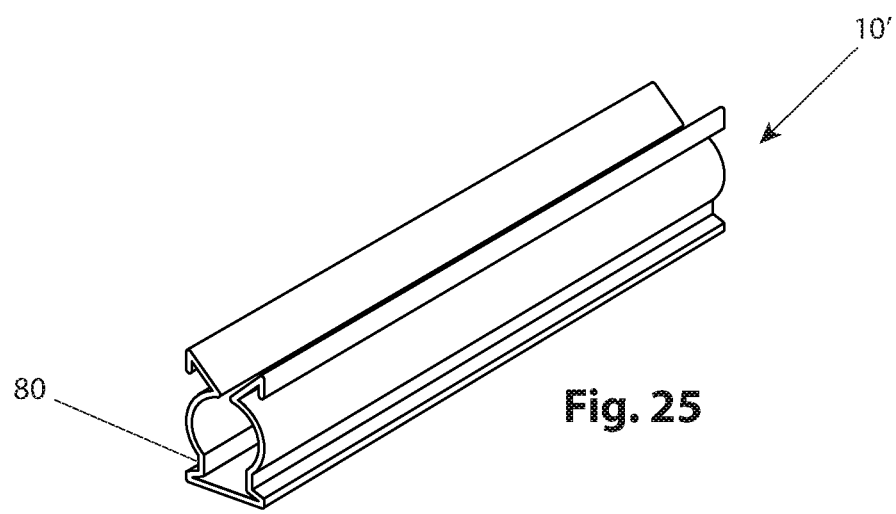
Fig. 25
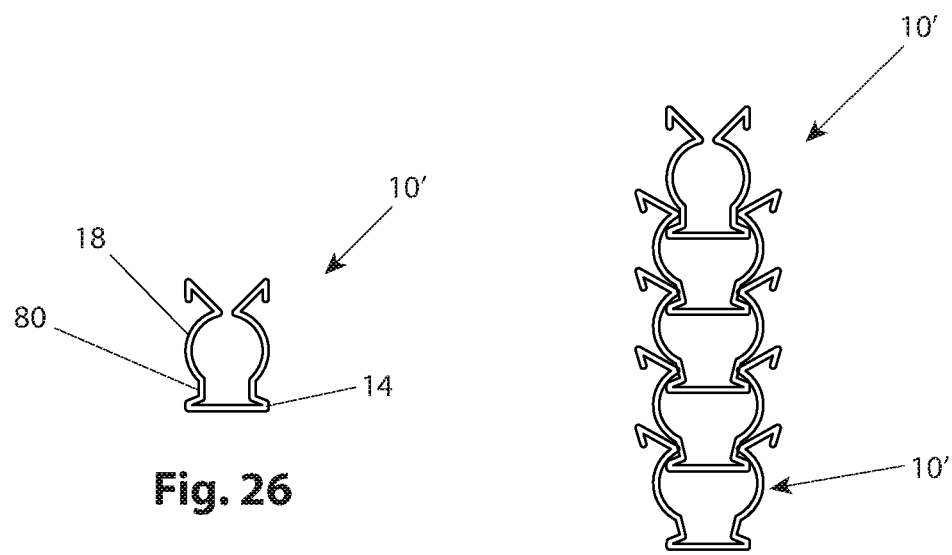
Fig. 26
Fig. 27

HANDLE FOR PLASTIC GROCERY BAGS OR THE LIKE AND RELATED SYSTEM

CROSS-REFERENCE TO RELATED APPLICATIONS

This application claims the benefit of U.S. Provisional Patent Application No. 62/169,616 filed 2 Jun. 2015, which application is herein expressly incorporated by reference.

FIELD

The present disclosure relates to a handle for a plastic grocery bag or the like. The present disclosure additionally relates to a system for coupling one or more plastic grocery bags to a handle. Further, the present disclosure relates to a system for securely mounting a handle and one or more associated plastic grocery bags within a motor vehicle.

BACKGROUND

Supermarkets and other stores commonly offer plastic bags for the transportation of purchased goods from the store to the consumers' home. These plastic bags have many advantages to the stores, such a low cost and a small storage volume.

While the plastic bags are generally convenient to the consumer there are associated disadvantages. For example, a single trip to a supermarket will often yield groceries filling many plastic bags. The weight of these filled plastic bags may frequently cause the consumer hand pain during transportation. Additionally, if the plastic bags are transported by vehicle, there is no practical way to keep the plastic bags upright and the purchased goods are often strewn about the vehicle before arriving home.

A need for improvement in the pertinent art exists to address the above discussed and other drawbacks.

SUMMARY

According to one particular aspect, the present teachings are directed to a handle for one or more plastic grocery bags or the like. The handle includes a base and first and second arms. The base is generally planar base and extends along a longitudinal axis. The first and second arms extend from the base and each include an arcuate portion proximate the base and a flange extending from the arcuate portion. The arcuate portions of the first and second arms cooperatively define a generally circular opening for receiving at least one plastic bag handle and the flanges are spaced apart from one another proximate the first and second arms to define a gap for permitting the at least one plastic bag handle to enter the generally circular opening.

According to another particular aspect, the present teachings are directed to a saddle for a handle for one or more plastic grocery bags. The handle includes a generally planar base extending along a longitudinal axis first and second arms extending from the base. The first and second arms each including an arcuate portion proximate the base and a flange extending from the arcuate portion. The saddle includes a pair of base elements. The pair of base elements cooperate to at least partially define a channel for receiving the handle. A length of the channel is limited to prevent translation of the handle and a width of the channel limited to prevent rotation of the handle within the channel.

According to yet another particular aspect, the present teachings provide a system for carrying a plurality of plastic bags. The system includes first and second handles. Each handle includes a generally planar base extending along a longitudinal axis and first and second arms extending from the base. The first and second arms each include an arcuate portion proximate the base and a flange extending from the arcuate portion. The first and second tote strap clasp members each include a handle receiving portion and a coupling portion. The handle receiving portion receives an associated one of the first and second handles. The system further includes a strap received by the coupling portions of the first and second tote strap clasp members.

According to still yet another particular aspect, the present teachings provide a chip clip arrangement including a receiving member and a retention member. The receiving member includes a generally planar base extending along a longitudinal axis first and second arms extending from the base. The first and second arms each include an arcuate portion proximate the base and a flange extending from the arcuate portion. The arcuate portions of the first and second arms cooperatively defines a generally circular opening for receiving retention member and the flanges are spaced apart from one another proximate the first and second arms to define a gap for permitting the retention member to enter the generally circular opening.

BRIEF DESCRIPTION OF THE DRAWINGS

The drawings described herein are for illustrative purposes only of selected embodiments and not all possible implementations, and are not intended to limit the scope of the present disclosure.

FIG. 9 is a perspective view of a rail assembly for a motor vehicle in accordance with the present teachings, the rail assembly shown operatively associated with a handle for receiving a plastic grocery bag or the like.

FIG. 10 is a cross-sectional view taken through the rail assembly and handle of FIG. 9.

FIG. 11A-11C is a series of views illustrating operation of the rail assembly of FIG. 9.

FIG. 15 is a perspective view of a chip clip arrangement in accordance with the present teachings, the chip clip arrangement shown operatively associated with a bag of chips.

FIG. 16 is a perspective view of the chip clip arrangement of FIG. 15 shown removed from the bag of chips for purposes of illustration.

FIG. 17 is a cross-sectional view of the chip clip arrangement of FIG. 16.

FIGS. 23 and 24 illustrate an OEM version of a rail assembly for a motor vehicle in accordance with the present teachings.

FIG. 25 is a perspective view similar to FIG. 2 illustrating another handle in accordance with the present teachings.

FIG. 26 is a side view of the handle of FIG. 25.

FIG. 27 is a side view of a plurality of the handles of FIG. 25 shown clipped together.

DETAILED DESCRIPTION

Example embodiments will now be described more fully with reference to the accompanying drawings. Further areas of applicability will become apparent from the description provided herein. The description and specific examples in this summary are intended for purposes of illustration only and are not intended to limit the scope of the present disclosure.

Figure 1:
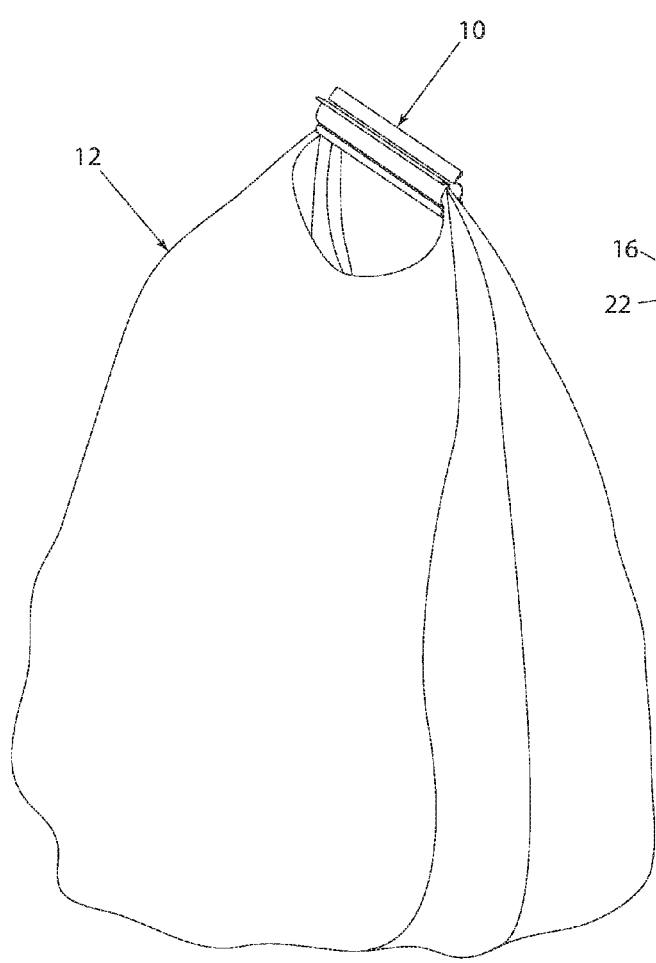
FIG. 1 is perspective view of a handle in accordance with the present teachings, the handle shown operatively associated with a plastic grocery bag.
Figure 2:
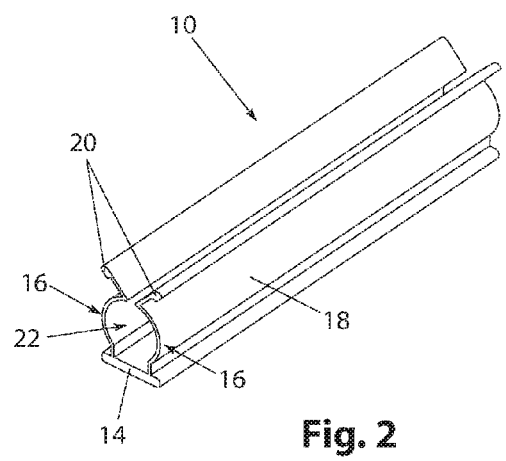
FIG. 2 is a perspective view of the handle of FIG. 1 shown removed from the plastic grocery bag for purposes of illustration.
Figure 3:
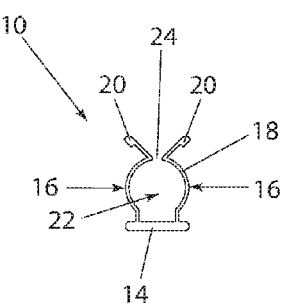
FIG. 3 is an end view of the handle of FIG. 2.

With initial reference to FIGS. 1 through 3, a handle in accordance with the present teachings is illustrated and generally identified at reference character 10. FIG. 1 shows the handle operatively associated with one particular plastic grocery bag 12. It will be understood that the present teachings may be utilized in connection with other plastic bags and bags constructed of alternative materials within the scope of the present teachings. FIGS. 2 and 3 illustrate the handle 10 apart from the plastic bag 10 for purposes of illustration.

In the embodiment illustrated, the handle 10 is illustrated to generally include a base 14 and a pair of arms 16. The base 14 may be generally planar and extend along a longitudinal axis of the handle 10. The arms 16 may extend from the base 14, run along the length of the handle 10, and be identical. As shown, the arms 16 may each include an arcuate portion 18 proximate the base 14 and a generally planar flange 20 extending from the arcuate portion 18. The arms 16 may be oriented relative to one another such that each is a mirror image of the other about a plane extending perpendicular to the base 14. The arcuate portions 18 of the arms 16 may cooperatively define a generally circular opening 22 for receiving and retaining the handle of one or more plastic bags. At proximal end adjacent the base 14, the flanges 20 are spaced apart from one another to define a gap 24 for receiving the handle of one or more plastic bags into the opening 22. The flanges 20 diverge from one another as they extend distally from the arcuate portions 18 of the arms 16. This cooperative geometry provides a structure which readily receives the handles of one or more plastic bags without undue required accuracy and directs the handles of the plastic bags into the generally circular opening 22.

The arms 16 may be resiliently displaced from one another. In this regards, the arm 16 may be constructed of plastic or other suitable material that may be elastically deflected such that the lateral dimension of the gap 24 is temporarily increased. In one particular application, the handle 10 may uniformly constructed through an extrusion process.

Figure 4:
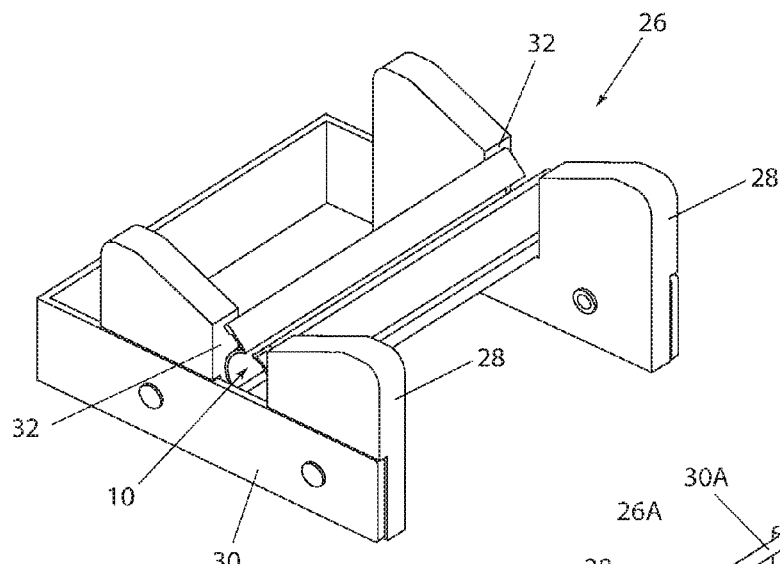
FIG. 4 is a perspective view of a saddle for coupling one or more plastic grocery bags to a handle in accordance with the present teachings.

With continued reference to FIGS. 1 through 3 and additionally reference to FIG. 4, a saddle for coupling one or more plastic grocery bags 12 to the handle 10 in accordance with the present teachings is shown and generally identified at reference character 26. The saddle 26 is generally illustrated to include a pair of base elements 28 and a frame 30 coupling the pair of base elements 28. The base elements 28 may be solid members constructed of any suitable material and may define openings 32. The base elements 28 are secured relative to one another by the frame 30. The frame 30 may be fixedly attached to the base elements 28 with fasteners or in any suitable manner known in the art. The openings 32 of the base elements 28 may be aligned to partially define a channel for receiving the handle 10. Upper surfaces of the base elements 28 may be angled to define lead-in surfaces for directing the handle 10 into the channel. The channel may have a width suitable toleranced with the handle 10 to prevent rotation of the handle 10 within the channel. The channel may have a length suitably limited to prevent too much translation of the handle 10 along its axial length. As illustrated, the channel is limited by the frame 30. The saddle 26 may be supported on a flat surface or mounted to a stationary structure in any well-known manner.

Figure 5:
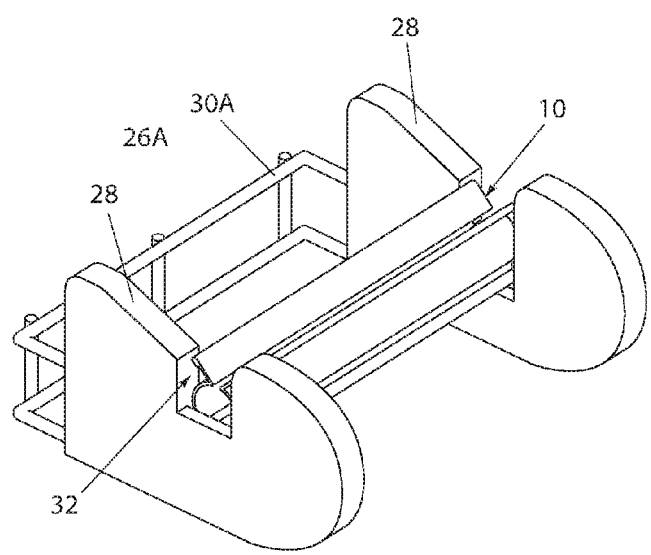
FIG. 5 is a perspective view of another saddle for coupling one or more plastic grocery bags to a handle in accordance with the present teachings, the saddle shown operatively associated with a handle.

Turning to FIG. 5, another saddle for coupling one or more plastic grocery bags to the handle 10 in accordance with the present teachings is shown and generally identified at reference character 26A. Given the similarities between the saddle 26 and the saddle 26A, the reference characters introduced with respect to saddle 26 are used to identify similar elements. The details not otherwise shown or described will be understood to be similar to corresponding details of the saddle 26. The saddle 26A generally differs from the saddle 26 in that the saddle 26A incorporates a wire frame 30A. The wire frame 30A may engage a rear side of the saddle 26A. The base elements 28 function to limit the axial length of the channel receiving the channel.

Figure 6:
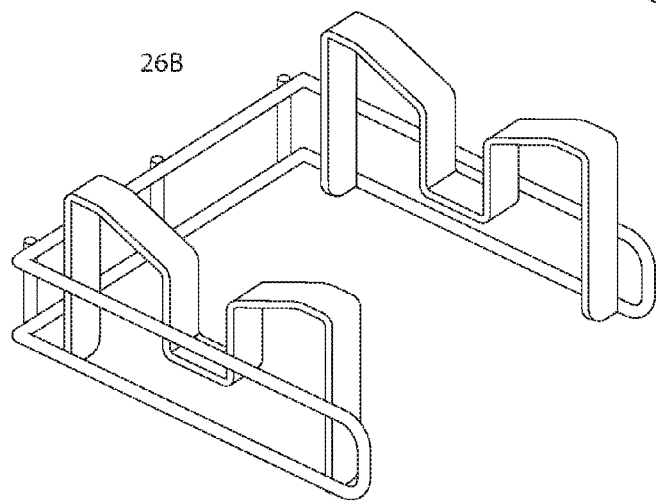
FIG. 6 is a perspective view of another saddle for coupling one or more plastic grocery bags to a handle in accordance with the present teachings, the saddle shown operatively associated with a handle.

Turning to FIG. 6, another saddle for coupling one or more plastic grocery bags to the handle 10 in accordance with the present teachings is shown and generally identified at reference character 26B. Again, given the similarities between the saddle 26 and the saddle 26B, the reference characters introduced with respect to saddle 26 are used to identify similar elements. The details not otherwise shown or described will be understood to be similar to corresponding details of the saddle 26. The saddle 26B generally differs from the saddle 26 in that the saddle 26B incorporates a wire frame 30A. The wire frame 30A may engage lateral sides of the saddle 26B. The frame 30A functions to limit the axial length of the channel receiving the handle 10.

Figure 7:
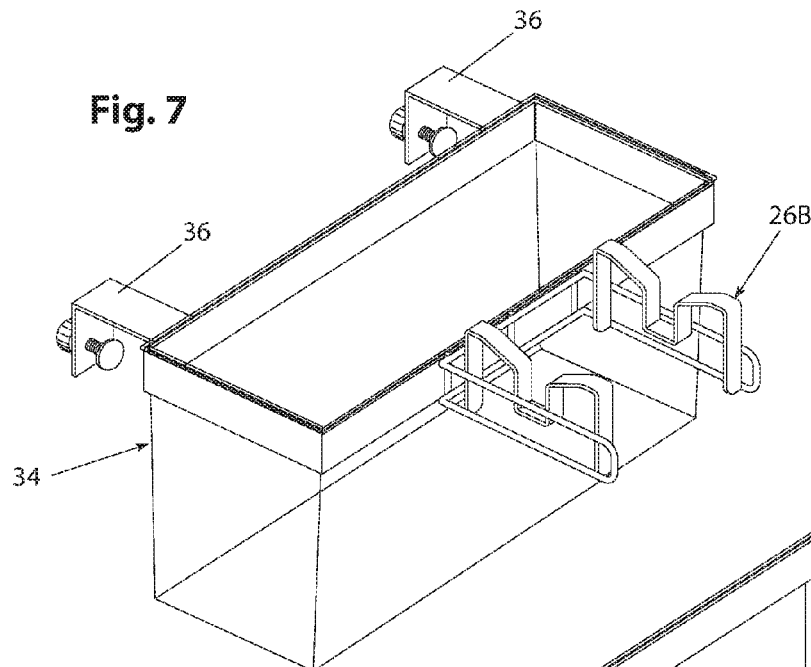
FIG. 7 is perspective view of the saddle of FIG. 6 shown the saddle operatively associated with a bin.

With reference to FIG. 7, the saddle 26B of FIG. 6 is shown operatively associated with a bin 34. The bin 34 is associated with a pair of mounting brackets 36. The saddle 26B may be securely attached to a front side of the bin 34 in any suitable manner.

Figure 8:
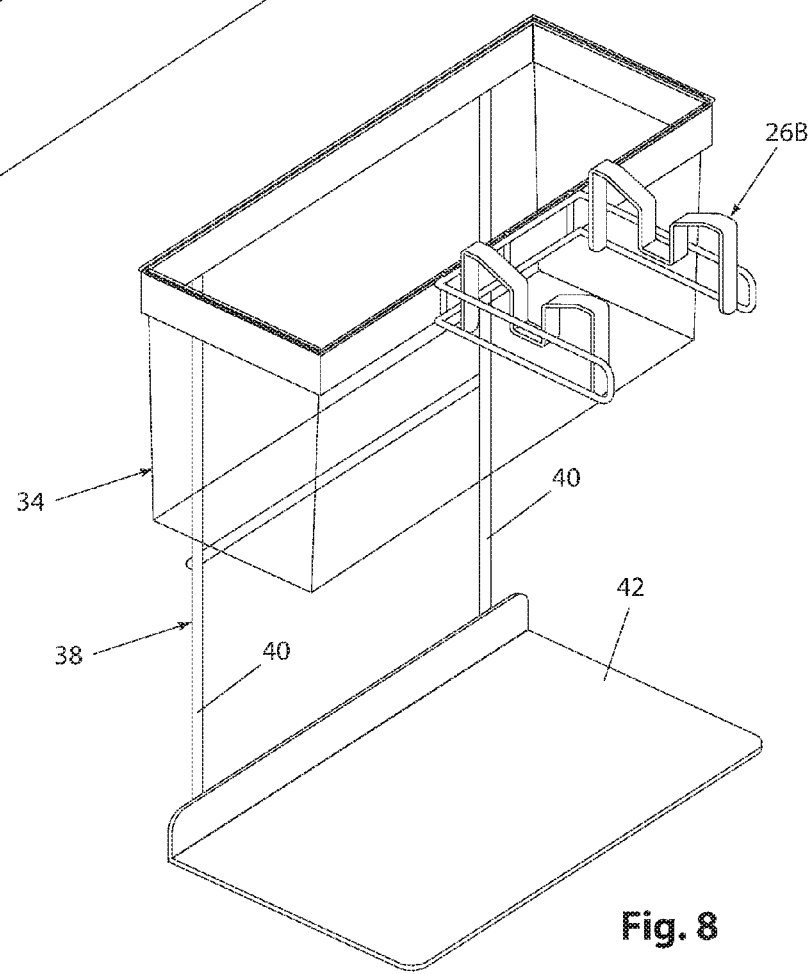
FIG. 8 is another perspective view of the saddle of FIGS. 4-6 shown operatively associated with a bin.

With reference to FIG. 8, the saddle 26B of FIG. 4 is shown operatively associated with the bin 34 of FIG. 7. In this particular application, the bin 34 may be associated with a stand 38. The stand 38 may include a pair of legs 40 and a self-supporting base 42.

Turning to FIGS. 9, 10 and 11A-11C, a rail assembly for a motor vehicle in accordance with the present teachings is illustrated and generally identified at reference character 44. The rail assembly shown 44 may be mounted within a vehicle, for example and adapted to receive one or more handles 10. In this manner, the handles may be retained during transportation of the groceries such that the groceries are retained within the plastic bags.

The rail assembly 44 may generally include a rail 46. The rail 46 may have a generally rectangular cross section and may define a longitudinally extending cavity. A front surface of the rail 46 may define a gap 48. The gap 48 may run completely or substantially the entire axial length of the rail 46 and may include an open end and a closed end. The gap includes a portion adjacent its open end which widens. In use, the flanges 20 of the handle 10 extend through the gap 48 such that distal ends of the flanges 20 are disposed in the cavity. The gap has a height along most of its length sufficiently tolerance relative to the dimensions of the handle 10 to compress the flanges 20 towards one another. As shown in the cross-sectional view of FIG. 10, the flanges 20 may be compressed such that they are parallel and adjacent one another. Enlarged ends of the flanges 20 prevent the flanges from withdrawal from the cavity in a direction perpendicular to the axial length of the rail 46. The diverging geometry of the gap 48 operates to compress the flanges 20 during introduction and direct the flanges 20.

The rail assembly 46 may further include a retention device 50. The retention device 50 may be mounted to the rail 46 for pivoting about a vertically extending axis (e.g., perpendicular to the longitudinally extending axis of the rail 46). The retention device 50 may be biased by a spring 52 to a closed position. The closed position is shown in FIG. 11B. In this position, the open end of the gap 48 is sufficiently closed to prevent withdrawal of the handle 10. A loading position of the retention device 50 is shown in FIG. 11A. In this position, the spring 52 is sufficiently deflected to introduce the handle 10. An unloading position is shown in FIG. 11C. The unloading position is attained by manually depressing the retention device 50 and sliding it forward to a locked open position. The hinge pin is in a small slot. Once pushed in, the hinge pin allows the user to slide the retention device 50 into a notch to keep it open.

Figure 12:
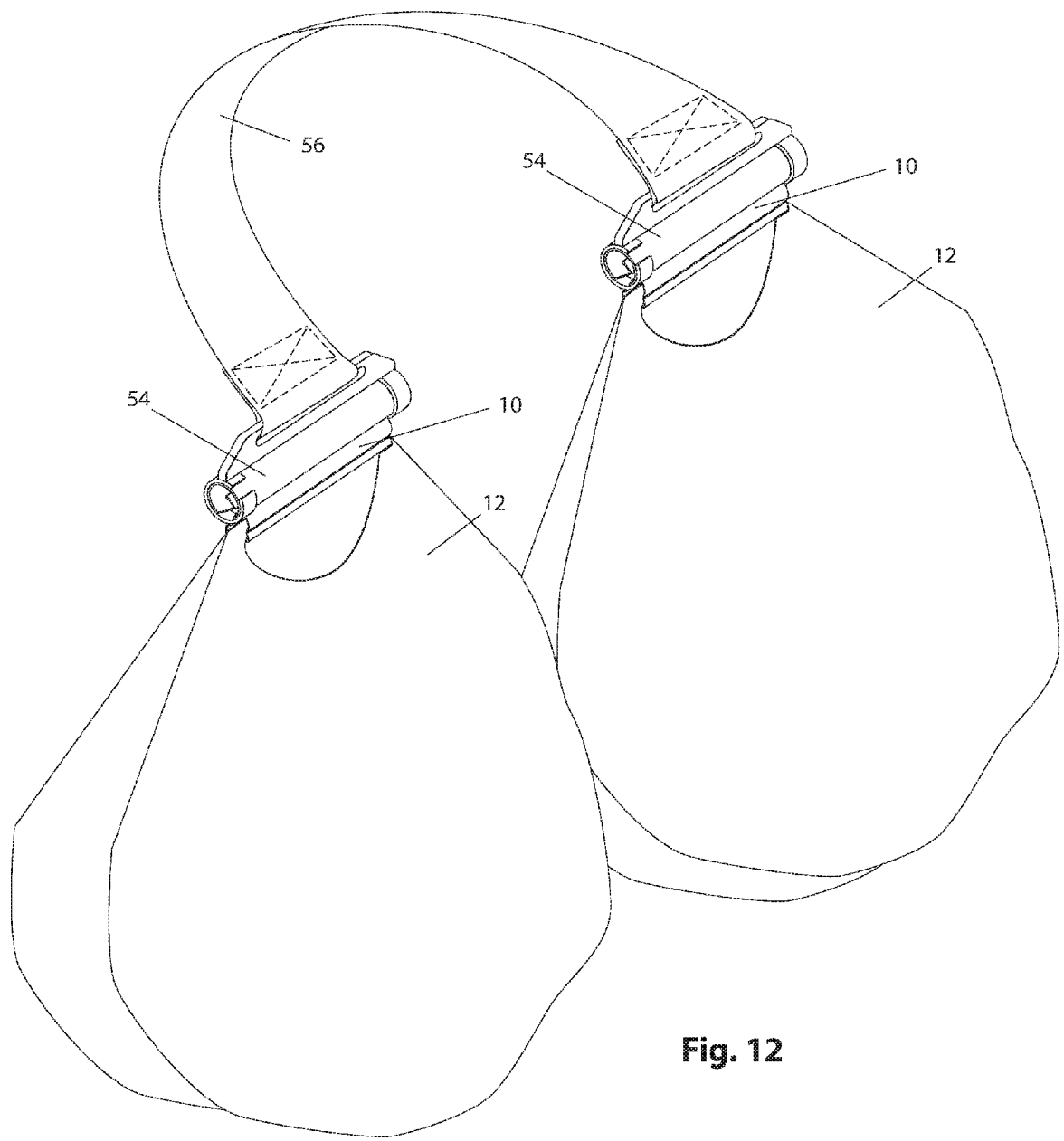
FIG. 12 is an environmental perspective view illustrating a pair of tote strap clasp members in accordance with the present teachings, the pair of tote strap clasp members shown operatively associated with a pair of handles, a plurality of plastic grocery bags and a tote strap.
Figure 13:
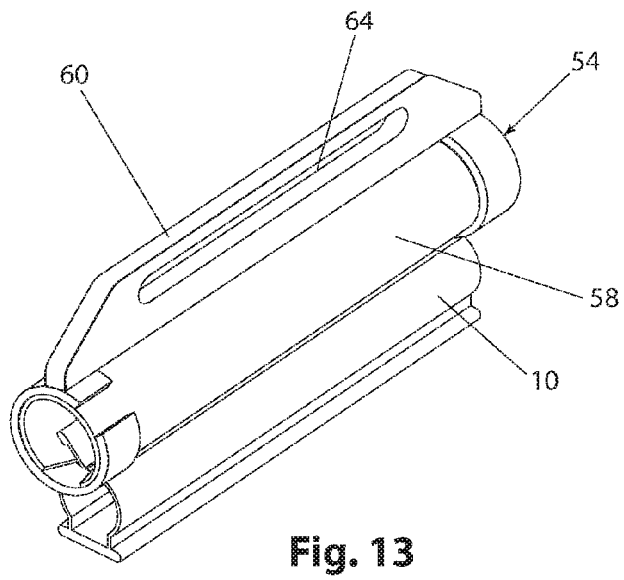
FIG. 13 is a perspective view of one of the tote strap clasp members and associated handle of FIG. 12.
Figure 14:
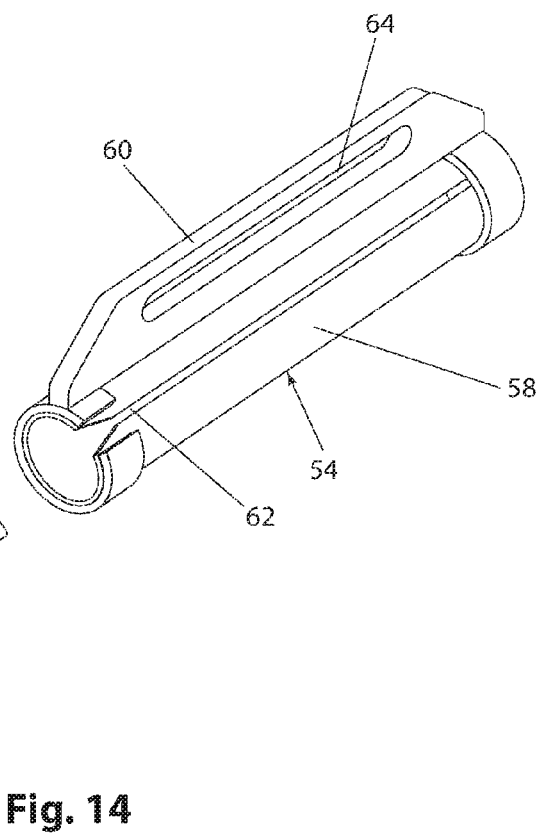
FIG. 14 is an exploded perspective view of the tote strap clasp member and associated handle of FIG. 13.

With reference to FIGS. 12 through 14, a tote strap clasp member in accordance with the present teachings is illustrated and generally identified at reference character 54. The tote strap clasp member 54 is shown operatively associated with the handle 10. FIG. 12 is an environmental view illustrating a pair of the tote strap clasp members 54 operatively associated with a pair of handles 10, a plurality of plastic grocery bags 12 and a tote strap 56.

The tote strap clasp member 54 is illustrated to generally include a handle receiving portion 58 and a coupling portion 60 for coupling to the strap 56. The handle receiving portion 58 may have a generally circular cross section and may define a longitudinally extending cavity. The handle receiving portion 58 may define a gap 62. The gap 62 may run completely or substantially the entire axial length of the handle receiving portion 58 and may include an open end and a closed end. The gap 62 includes a portion adjacent its open end which widens. In use, the flanges 20 of the handle 10 extend through the gap 48 such that distal ends of the flanges 20 are disposed in the cavity. The enlarged ends of the flanges 20 prevent the flanges from withdrawal from the cavity in a direction perpendicular to the axial length of the handle receiving portion 58. The diverging geometry of the gap 62 operates to compress the flanges 20 during introduction and direct the flanges 20.

The handle receiving portion 60 may be formed with the handle receiving portion 58 through an injection molding process, for example. The handle receiving portion 60 may radially extend from the handle receiving portion 58 and may define a slot 64 for receiving the strap 56.

Turning to FIGS. 15-17, a chip clip arrangement in accordance with the present teachings is illustrated and generally identified at reference character 66. In FIG. 15, the chip clip arrangement 66 is shown operatively associated with a bag of chips 68. The chip clip arrangement 66 is generally shown to include a receiving member 70 and a retention member 72. The receiving member 70 generally includes a base 74 and a pair of arms 76. The base 74 may be generally planar and extend along a longitudinal axis of the receiving member 70. The arms 76 may extend from the base 74, run along the length of the receiving member 70, and be identical. As shown, the arms 76 may each include an arcuate portion 78 proximate the base 74 and a generally planar flange 80 extending from the arcuate portion 78. The arms 76 may be oriented relative to one another such that each is a mirror image of the other about a plane extending perpendicular to the base 74. The arcuate portions 78 of the arms 76 may cooperatively define a generally circular opening 82 for receiving and retaining the retention member 72. At proximal end adjacent the base 74, the flanges 80 are spaced apart from one another to define a gap 84 for receiving the receiving member 70 into the opening 82. The flanges 80 diverge from one another as they extend distally from the arcuate portions 78 of the arms 76.

The arms 76 may be resiliently displaced from one another. In this regards, the arms 76 may be constructed of plastic or other suitable material that may be elastically deflected such that the lateral dimension of the gap 84 is temporarily increased to receive the retention member. In one particular application, the receiving member 70 may uniformly constructed through an extrusion process.

As shown in the drawings, retention member 72 may be a hollow tube. The open end of the chip bag 68 may be wrapped around the retention member 82 prior to introduction into the opening 82. Upon introduction into the opening 82, the chip bag 68 is captured and sealed.

Figure 18:
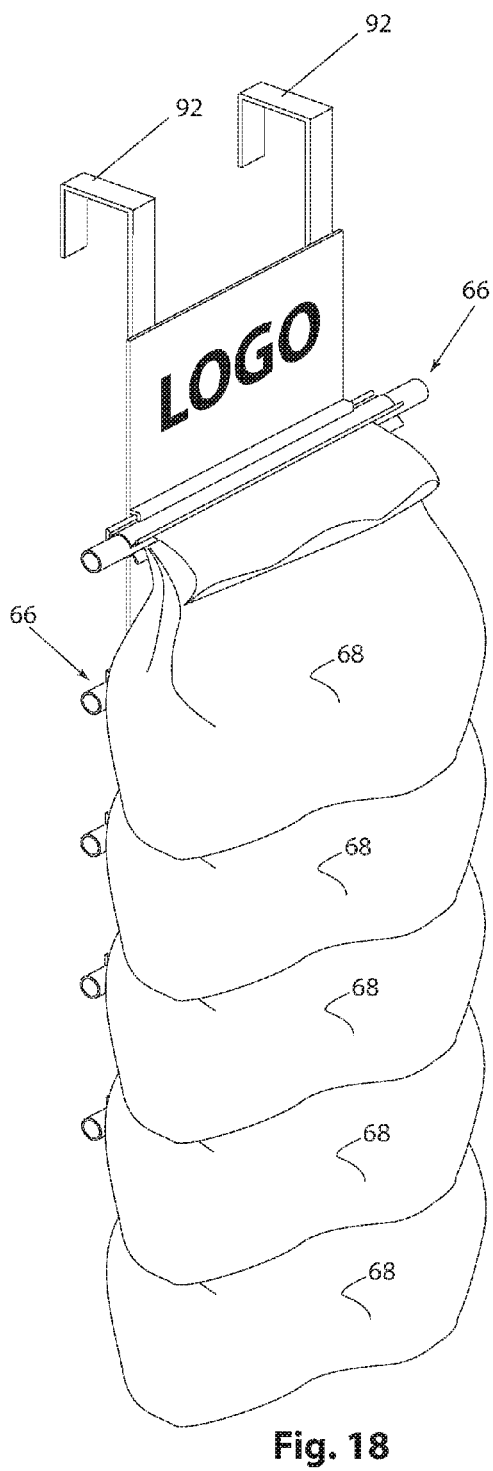
FIG. 18 is a perspective environmental view illustrating a plurality of chip clip arrangements in accordance with the present teachings, the plurality of chip clip arrangements shown carried on a common rack and each associated with a bag of chips.
Figure 19:
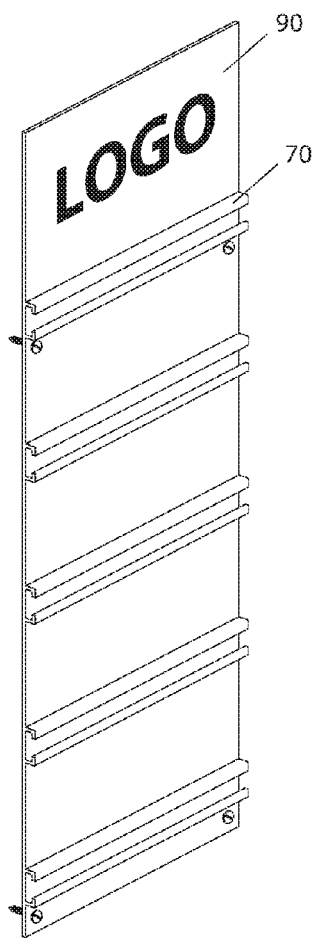
FIG. 19 is a perspective view of the rack of FIG. 18 shown with the chip clip arrangements and bags of chips removed for purposes of illustration.
Figure 20:
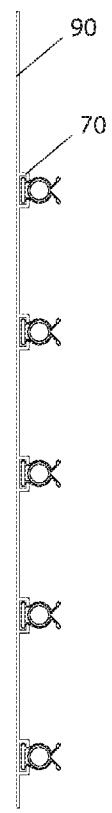
FIG. 20 is a side view of the rack and chip clip arrangements of FIG. 18.

Turning to FIGS. 18-20, a plurality of the chip clip arrangement of FIGS. 15-17 are shown carried on a common rack 90 and each associated with a bag of chips 68. As illustrated, the receiving members 70 may be permanently attached to the rack 90. The rack 90 may be associated with conventional mounting brackets 92.

Figure 21:
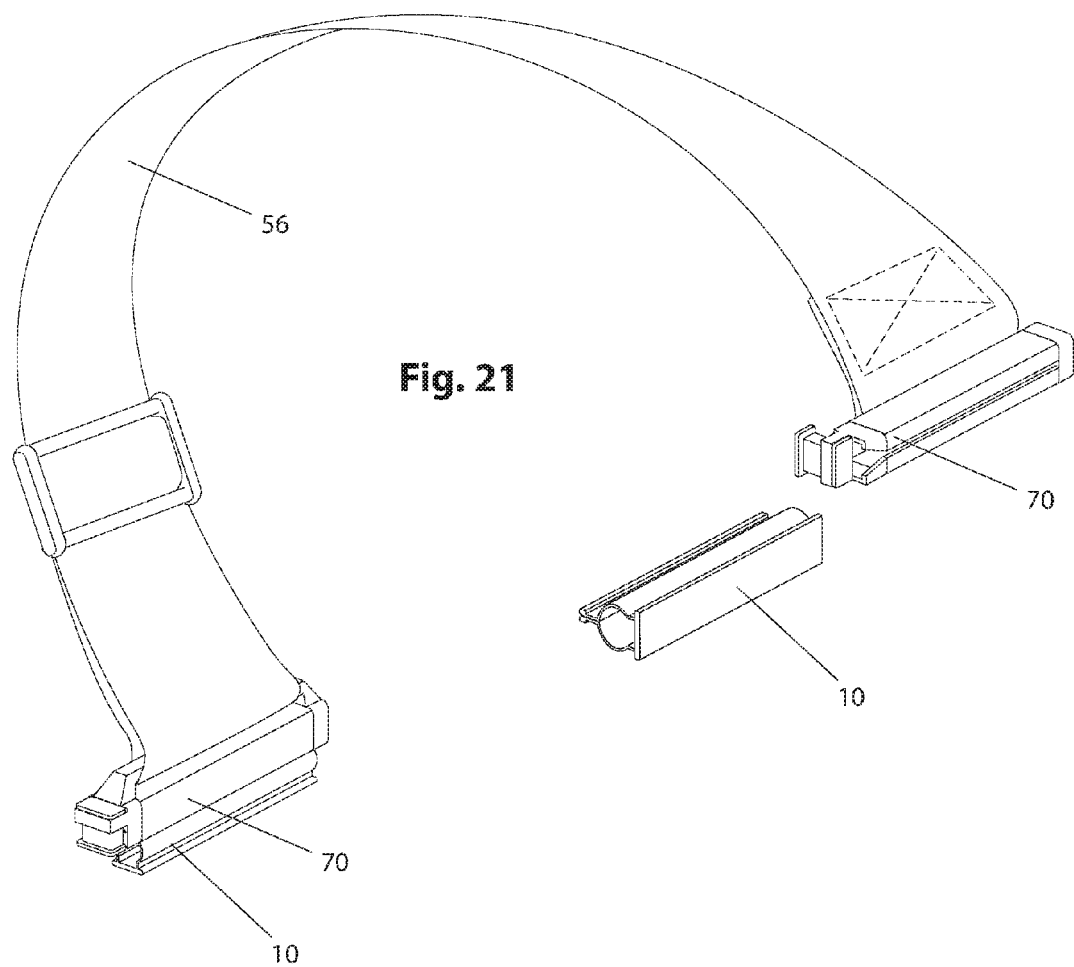
FIG. 21 is an environmental perspective view illustrating a pair of alternative tote strap clasp members in accordance with the present teachings, the pair of alternative tote strap clasp members shown operatively associated with a pair of alternative handles, a plurality of plastic grocery bags and a tote strap.
Figure 22:
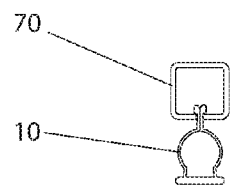
FIG. 22 is a cross sectional view taken through one of the tote strap clasp members of FIG. 21 shown operatively associated with the respective handle 10.

With reference to FIGS. 21 and 22, a pair of alternative tote strap members in accordance with the present teachings are illustrated and generally identified at reference character 70. As compared to the embodiment of FIG. 12, the tote strap members 70 provide an alternative way for closing off the slot. As compared use of the cylinder with the slot in FIG. 14, the embodiment of FIGS. 21 and 22 may possible result in reduced clothing snags.

Turning to FIGS. 23 and 24, an OEM version of a rail assembly for a motor vehicle in accordance with the present teachings is illustrated and generally identified at reference character 80. The rail assembly 10 may be molded into side panels or seatbacks of a motor vehicle, for example. The rail assembly 80 may use a locking spring button that can be pushed once to open a slot, and pushed again to close the slot.

Figure 28:
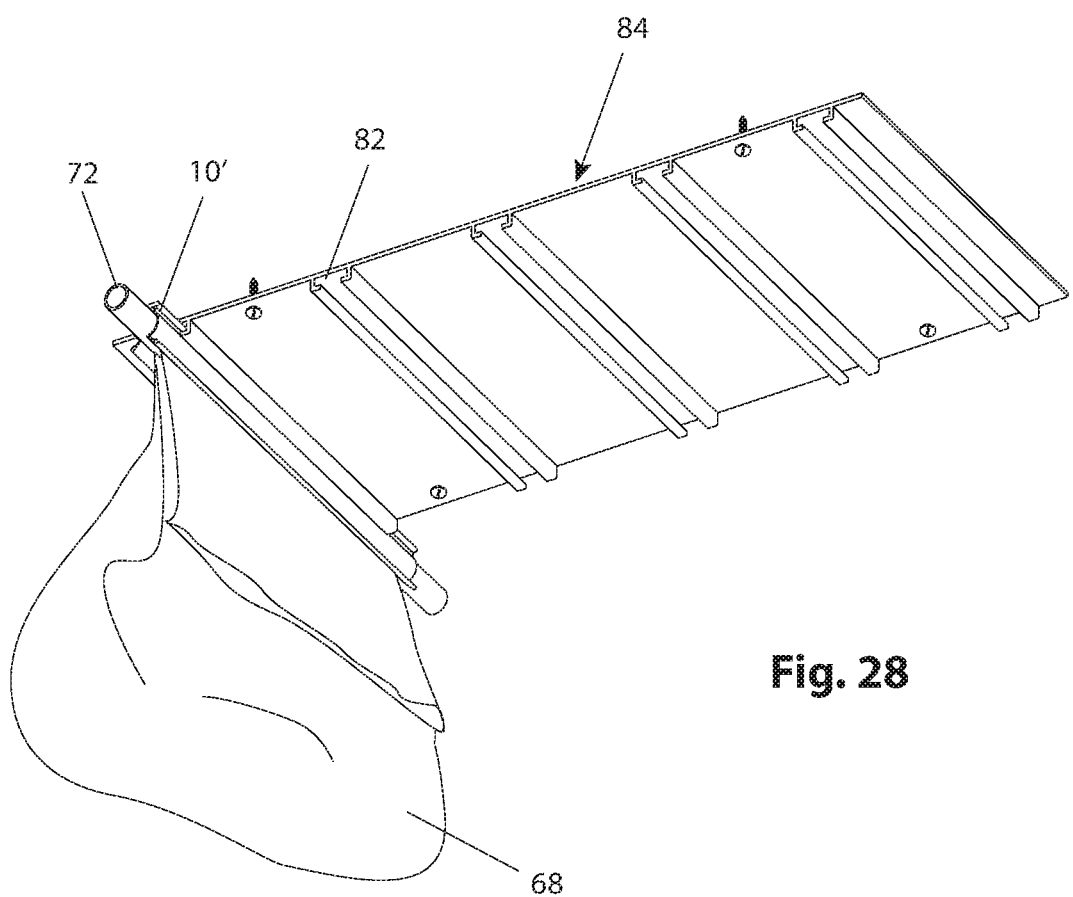
FIG. 28 is a perspective view of the handle of FIG. 25 shown operatively associated with a rack.

Turning to FIGS. 25 and 26, another handle in accordance with the present teachings is illustrated and generally identified at reference character 10'. It will be understood that the handle 10' is similar to the handle 10. For this reason, similar reference characters are used to identify similar elements. The handle 10' differs from the handle 10 by having a uniform wall thickness. As shown in FIG. 28, a groove 80 proximate the base 14 is adapted to slide into a slot 82 of a rack 84. The rack 84 may be secured to an underside of a shelf, for example, with conventional fasteners. The groove 80 also enables better organization through clipping together of a plurality of handles 10', as shown in FIG. 27.

The foregoing description of the embodiment(s) has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. One or more example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A handle for one or more grocery bags, the handle comprising:
    a generally planar base extending along a longitudinal axis; and
    first and second arms extending from the base, the first and second arms each including an arcuate portion proximate the base and a flange extending from the arcuate portion;
    wherein the arcuate portions of the first and second arms cooperatively define an opening for receiving at least one plastic bag handle and the flanges are spaced apart from one another proximate the first and second arms to define a gap for permitting at least one plastic bag handle to enter the opening,
    wherein the first and second arms each further include a linear segment between the respective arcuate portion and the generally planar base.

2. The handle of claim 1, wherein the opening is generally circular.

3. The handle of claim 1, wherein the first and second arms are mirror images of one another.

4. The handle of claim 1, in combination with a plastic grocery bag.

5. A system for carrying a plurality of plastic bags, the system comprising:
    first and second handles, each handle including a generally planar base extending along a longitudinal axis and first and second arms extending from the base, the first and second arms each including an arcuate portion proximate the base and a flange extending from the arcuate portion;
    first and second tote strap clasp members, each tote strap clasp member including a handle receiving portion and a coupling portion, the handle receiving portion receiving an associated one of the first and second handles; and
    a strap received by the coupling portions of the first and second tote strap clasp members.

6. A handle for one or more grocery bags, the handle comprising:
    a base extending along a longitudinal axis; and
    first and second arms extending from the base, the first and second arms each including an arcuate portion proximate the base and a flange extending from the arcuate portion, the arcuate portions of the first and second arms cooperatively defining an opening for receiving at least one plastic bag handle and the flanges are spaced apart from one another proximate the first and second arms to define a gap for permitting at least one plastic bag handle to enter the opening,
    wherein the handle includes a length along the longitudinal axis and a width perpendicular to the length, the length being greater than the width.

7. The handle of claim 6, wherein the first and second arms each further include a linear segment between the respective arcuate portion and the generally planar base.

8. The handle of claim 6, wherein the base is planar.

9. The handle of claim 6, wherein the first and second arms extend completely along the length of the handle.

10. The handle of claim 6, wherein the flanges of the first and second arms are generally planar.

* * * * *